(12) United States Patent
Akiyama

(10) Patent No.: US 7,123,838 B2
(45) Date of Patent: Oct. 17, 2006

(54) OPTICAL TIME-DIVISION MULTIPLEX SIGNAL PROCESSING APPARATUS AND METHOD, OPTICAL TIME-DIVISION MULTIPLEX SIGNAL RECEIVER

(75) Inventor: Tomoyuki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 916 days.

(21) Appl. No.: 09/963,709

(22) Filed: Sep. 27, 2001

(65) Prior Publication Data
US 2002/0067527 A1    Jun. 6, 2002

(30) Foreign Application Priority Data
Dec. 6, 2000    (JP) ............................. 2000-371918

(51) Int. Cl.
*H04J 14/02* (2006.01)
*H04J 14/08* (2006.01)
*H04B 10/12* (2006.01)
*H04B 10/00* (2006.01)

(52) U.S. Cl. ..................... 398/98; 398/81; 398/102; 398/147; 398/148; 398/159; 398/161

(58) Field of Classification Search ............... 398/53, 398/81, 82, 86, 87, 98, 101, 102, 147–149, 398/159, 161, 202
See application file for complete search history.

(56) References Cited

U.S. PATENT DOCUMENTS

| | | | |
|---|---|---|---|
| 5,926,297 A * | 7/1999 | Ishikawa et al. | 398/43 |
| 6,456,411 B1 * | 9/2002 | Ishikawa et al. | 398/192 |
| 6,587,242 B1 * | 7/2003 | Shake et al. | 398/98 |
| 6,661,974 B1 * | 12/2003 | Akiyama et al. | 398/95 |

* cited by examiner

*Primary Examiner*—Dalzid Singh
(74) *Attorney, Agent, or Firm*—Armstrong, Kratz, Quintos, Hanson, & Brooks, LLP.

(57) ABSTRACT

An optical time-division multiplex signal processing apparatus includes an optical dispersion part providing optical dispersion to an optical time-division multiplex signal and an optical clock signal, an optical detector coupled optically to the optical dispersion part for detecting a beat signal formed between the optical time-division multiplex signal and the clock signal in a superposed state, and a filter connected to an output terminal of the optical detector for filtering out an electric signal of a desired frequency band from an output electric signal of said optical detector.

12 Claims, 13 Drawing Sheets

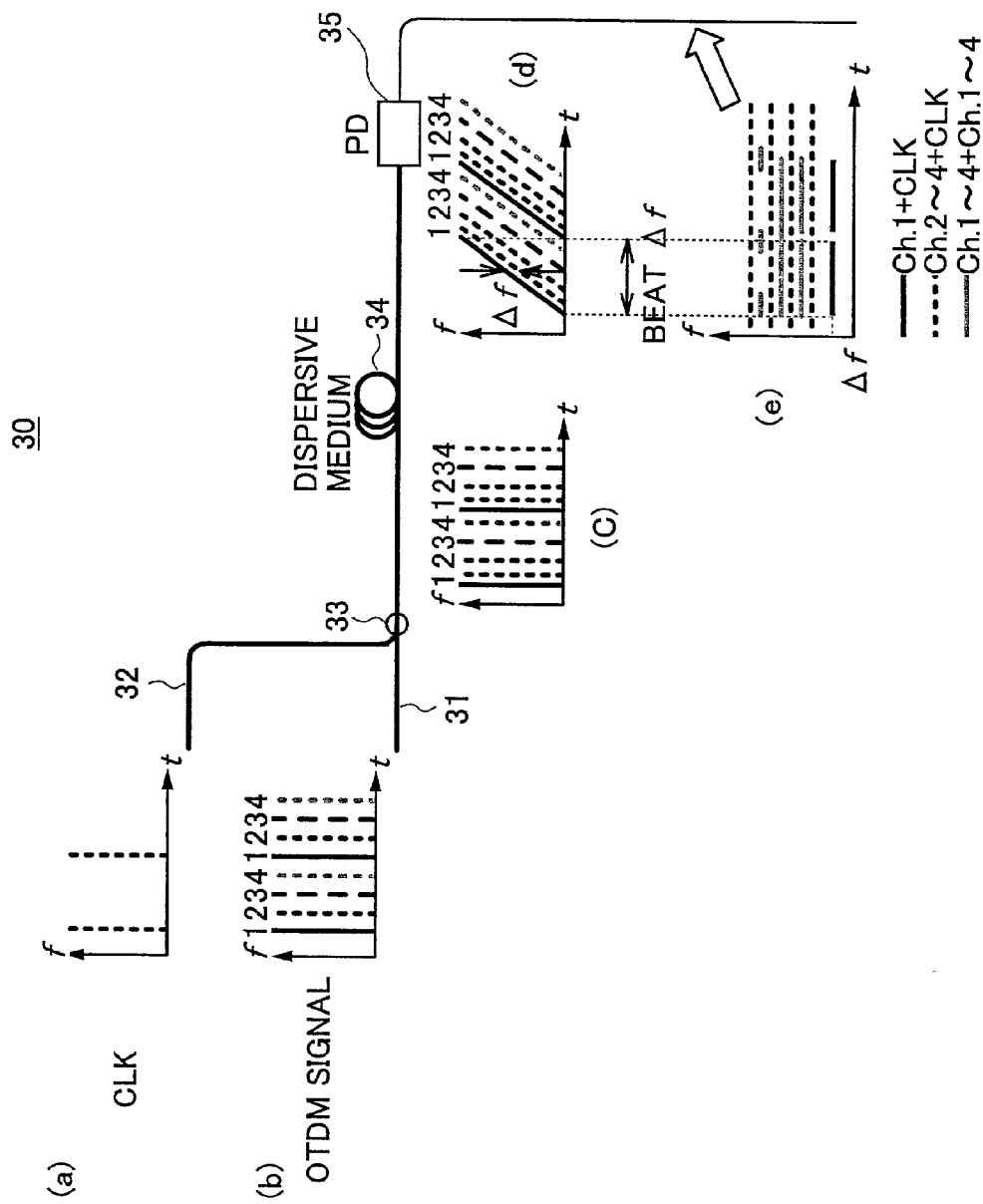

OPTICAL TIME-DIVISION MULTIPLEX SIGNAL PROCESSING APPARATUS AND METHOD, OPTICAL TIME-DIVISION MULTIPLEX SIGNAL RECEIVER

CROSS-REFERENCE TO RELATED APPLICATION

The present application is based on Japanese priority application No.2000-371918 filed on Dec. 6, 2000, the entire contents of which are hereby incorporated by reference.

BACKGROUND OF THE INVENTION

The present invention generally relates to optical signal processing apparatuses and especially to an optical time-division multiplex signal processing apparatus.

Optical time-division multiplexing technology is an indispensable art in today's super-fast optical telecommunication system in addition to the technology of wavelength-multiplexing.

In the optical time-division multiplexing technology, signal components of channels are sampled with different timings. By superposing the signal components thus sampled, a multiplexed optical signal is formed. As a result, it becomes possible to transmit optical signals of plural channels through a single optical fiber.

In the technology of optical time-division multiplexing, the speed of incoming optical time-division multiplex signals is generally much higher than the response speed of a photodiode or other high-speed optical detectors. Because of this, it is practiced to first separate the incoming optical time-division multiplex signal supplied to a receiver into optical signal components of respective channels by using an electro-optic modulator and then detect the optical signal components thus separated by a photodiode.

FIG. 1 shows an example of a conventional optical time-division multiplex signal receiver 10.

Referring to FIG. 1, an optical time-division multiplex signal OTDM transmitted through an optical fiber 11 is supplied to an electro-optic modulator 12. The electro-optic modulator 12 is further supplied with a clock voltage signal corresponding to a desired channel from a clock signal source 13 and changes the transmittance thereof in response to the clock voltage signal. As a result, the optical sampling is achieved in the electro-optic modulator 12 with respect to the incoming optical time-division multiplex signal with the timing provided by the clock voltage signal, and an optical signal component for a specified channel is extracted. The optical signal component thus extracted is then supplied to a photodiode 14 through an optical fiber or an optical waveguide for conversion to an electric signal.

FIG. 2 shows the construction of another optical time-division multiplex signal receiver 20.

Referring to FIG. 2, an optical time-division multiplex signal OTDM transmitted through an optical fiber 21 is supplied to an all-optical gate 23, wherein the all-optical gate 23 is supplied with an optical clock signal via an optical waveguide 22 and changes a transmittance thereof in response to the optical clock signal. As a result, the optical signal component of the channel corresponding to the optical clock signal is extracted and is outputted to an optical waveguide 24 formed at an output side of the all-optical gate 23. The optical signal component thus extracted is detected by a photodiode 25.

However, in the construction of FIG. 1, there exists a drawback in that, while the response speed of the electro-optic modulator 12 is faster than the response speed of a photodiode, there is a limit and the advantage may be lost in the case the transmission rate of the optical time-division multiplex signal is increased further in future.

In the construction of FIG. 2, the all-optical gate 23 has a response speed sufficient for responding to a high-speed optical time-division multiplex signal. However, such an all-optical gate 23, relying upon the optical-absorption-saturation phenomenon caused by an optical clock signal, requires a strong optical clock signal for on-off driving, and there arises a problem in that a large and bulky construction is necessary.

SUMMARY OF THE INVENTION

Accordingly, it is a general object of the present invention to provide a novel and useful optical time-division multiplex signal processing apparatus wherein the foregoing problems are eliminated.

Another and more specific object of the present invention is to provide an optical time-division multiplex signal processing apparatus capable of extracting optical signal components of respective channels from a high-speed optical time-division multiplex signal with simple construction.

Another object of the present invention is to provide an optical time-division multiplex signal processing apparatus, comprising:

an optical dispersion part supplied with an optical time-division multiplex signal and an optical clock signal, said optical dispersion part providing optical dispersion to said optical time-division multiplex signal and said optical clock signal;

an optical detector coupled optically to said optical dispersion part, said optical detector detecting said optical time-division multiplex signal and said clock signal from said optical dispersion part in a superposed state; and a filter connected to an output terminal of said optical detector, said filter filtering out an electric signal of a desired frequency band from an output electric signal of said optical detector.

According to the present invention, the optical time-division multiplex signal and optical clock signal are provided with a chirp by the optical dispersion part. As a result, each of the optical time-division multiplex signal and the optical clock signal undergoes a change of spectrum such that the wavelength changes with time. Thus, each of the optical signals is changed into an optical signal having a waveform that continues for some time as a result of the chirp, even in the case the incoming optical signal is a very short optical impulse. The optical signals each provided with a chirp as such are superimposed with each other in the present invention, and as a result, there is caused a beat, as a result of interference between the optical time-division multiplex signal and the optical clock signal, with a frequency corresponding to the timing difference between the optical time-division multiplex signal and the optical clock signal. Thus, by detecting the beat by using an optical detector and by taking out a desired frequency band by using a filter, it becomes possible to extract the signal component of a desired channel from the optical time-division multiplex signal.

Thus, according to the present invention, it becomes possible to provide a signal processing apparatus that separates the high-speed optical time-division multiplex signal into respective channels by a very simple construction.

Other objects and further features of the present invention will become apparent from the following detailed description when read in conjunction with the attached drawings.

BRIEF DESCRIPTION OF THE DRAWINGS

FIG. 4 is a diagram explaining the operational principle of the optical time-division multiplex signal receiver of FIG. 3;

DETAILED DESCRIPTION OF THE INVENTION

[First Embodiment]

Figure 1:
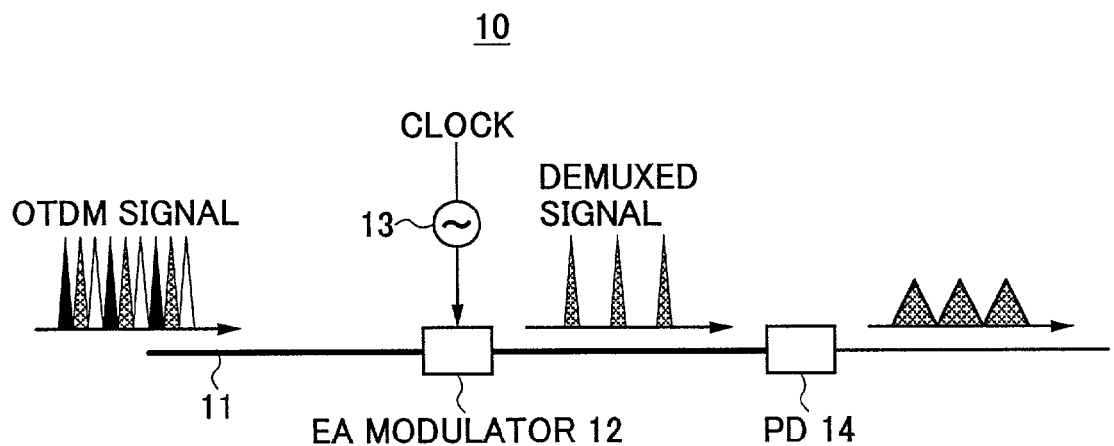
FIG. 1 is a diagram showing the construction of an optical time-division multiplex signal receiver according to a related art.
Figure 2:
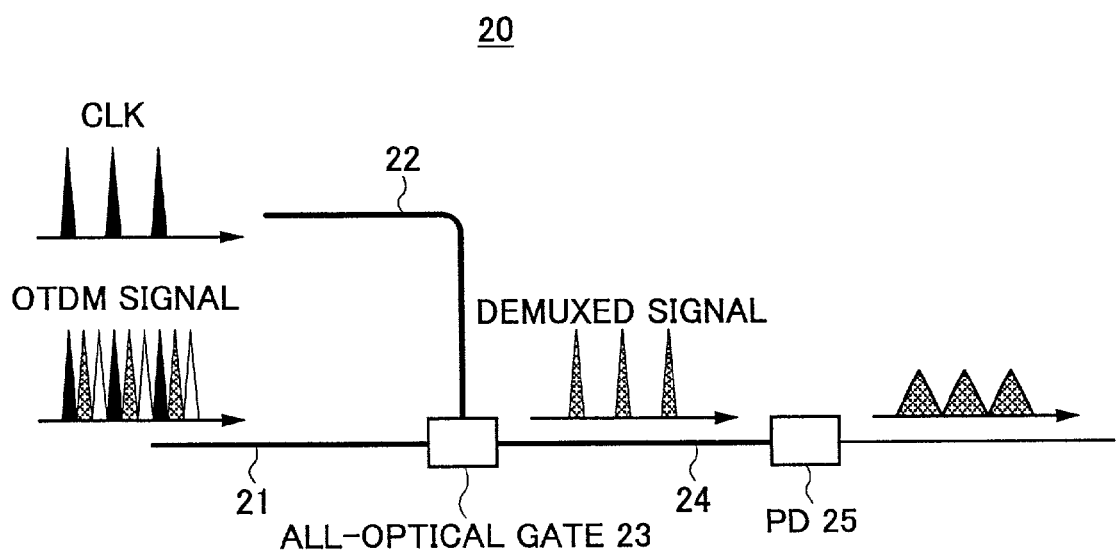
FIG. 2 is a diagram showing the construction of an optical time-division multiplex signal receiver according to another related art.
Figure 3:
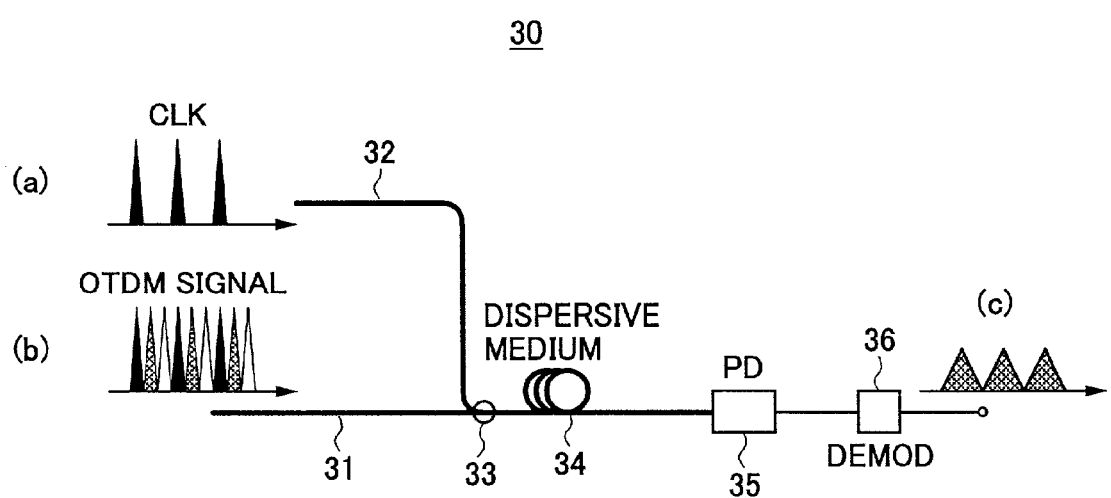
FIG. 3 is a diagram showing the construction of an optical time-division multiplex signal receiver according to a first embodiment of the present invention.

FIG. 3 is a diagram showing the construction of a receiver 30 of an optical time-division multiplex signal according to a first embodiment of the present invention, while FIG. 4 explains the operational principle of the receiver 30.

Referring to FIG. 3, the receiver 30 has a construction in which an optical fiber 31 guiding an incoming optical time-division multiplex signal OTDM and an optical fiber 32 guiding an optical clock signal CLK are connected optically with each other in an optical coupler 33, and thus, the time-division multiplex signal and optical clock signal CLK are superposed in the optical coupler 33. The optical signal thus formed as a result of the superposition is then injected from the optical coupler 33 into a dispersion medium 34, which may be formed of an optical fiber loop. As represented in (a) and (b) of FIG. 3, the optical time-division multiplex signal OTDM and also the optical clock signal CLK are formed of an optical pulse train. As will be explained in detail with reference to FIG. 4, the optical pulses forming the optical time-division multiplex signal OTDM or the optical clock signal CLK undergoes a dispersion in the dispersion medium 34, and there is formed a chirp in the optical time-division multiplex signal OTDM and the optical clock signal CLK as they are transmitted along the dispersion medium 34.

The optical time-division multiplex signal OTDM and the optical clock signal CLK thus provided with a chirp are then converted to an electric signal in a photodiode 35. Further, by using a demodulator circuit 36 that includes a filter therein, a signal component of desired channel is extracted from the output electric signal of the photodiode 35, as represented in (c) of FIG. 3.

Next, FIG. 4 is referred to.

In (b) of FIG. 4, it can be seen that the optical signal pulses of the channels 1–4 are repeated consecutively in the optical time-division multiplex signal OTDM and are transmitted along the optical fiber 31 to form a pulse train, wherein each optical signal pulse has a widely spread frequency spectrum pertinent to an impulse. Further, the optical clock signal CLK in optical fiber 32 also has a widely spread frequency spectrum as shown in (a) of FIG. 4. In (a) and (b) of FIG. 4, it should be noted that the vertical axis represents the frequency while the horizontal axis represents the time. The optical time-division multiplex signal OTDM and optical clock signal CLK are superposed with each other in an optical coupler 33. Thus, the optical signals that are injected into the dispersion medium 34 from the optical coupler 33 has a spectrum in which the time-division multiplex signals OTDM and the optical clock signals CLK are superposed as represented in (c) of FIG. 4. In the illustrated example, the timing of optical clock signal CLK is slightly behind the timing of the optical signal pulse for the channel 1.

The optical signals thus entered into the dispersion medium 34 experience a dispersion as explained previously, and the spectrum of the optical signals is changed to a characteristic spectrum including a chirp as represented in (d) of FIG. 4. In (d) of FIG. 4, it can be seen that there is caused a change of frequency from low frequency to high frequency with time in correspondence to the chirp. In the optical signal including such a chirp, the optical signal pulse and the optical clock signal pulse CLK of the channels 1–4 exist simultaneously at an arbitrary time, and accordingly, there is caused a beat as a result of interference of these signals.

For example, it can be seen in FIG. 4 that there exists a generally constant frequency difference $\Delta f$ between the optical pulse spectrum for the channel 1 and the optical pulse spectrum for the optical clock CLK due to the fact that both the optical time-division multiplex signal OTDM and the optical clock signal CLK experience the same chirp in the same dispersion medium 34. As a result, the optical signal that exits from the dispersion medium 34 includes the beat signal of the beat frequency $\Delta f$ as shown in (e) of FIG. 4. As the beat signal of the beat frequency $\Delta f$ is formed as a result of interference between the optical signal component for the channel 1 and the optical clock, the beat signal maintains the information transmitted over the channel 1.

Thus, it becomes possible to detect the beat signal of the beat frequency $\Delta f$ in the form of electric signal by detecting the exit optical signal of the dispersion medium 34 by a photodiode 35 as shown in (e) of FIG. 4. Furthermore, there appear, at the output terminal of the photodiode 35, beat signals formed as a result of interference between the optical signal components for the channels 2–4 and the optical clock CLK or as a result of mutual interference between the optical signal components of the channels 1–4. These additional beat signal components have a higher beat frequency than the beat frequency $\Delta f$.

Thus, by extracting the beat signal of the beat frequency $\Delta f$ from the output signal of the photodiode 35 by using an appropriate filtering circuit, it becomes possible to reproduce the information that was transmitted through the channel 1. Thereby, the photodiode 35 has a sufficient response speed for signal detection, as the photodiode 35 is used to detect the beat signal of the frequency $\Delta f$, not the high-speed optical time-division multiplex signal OTDM itself.

Figure 5A:
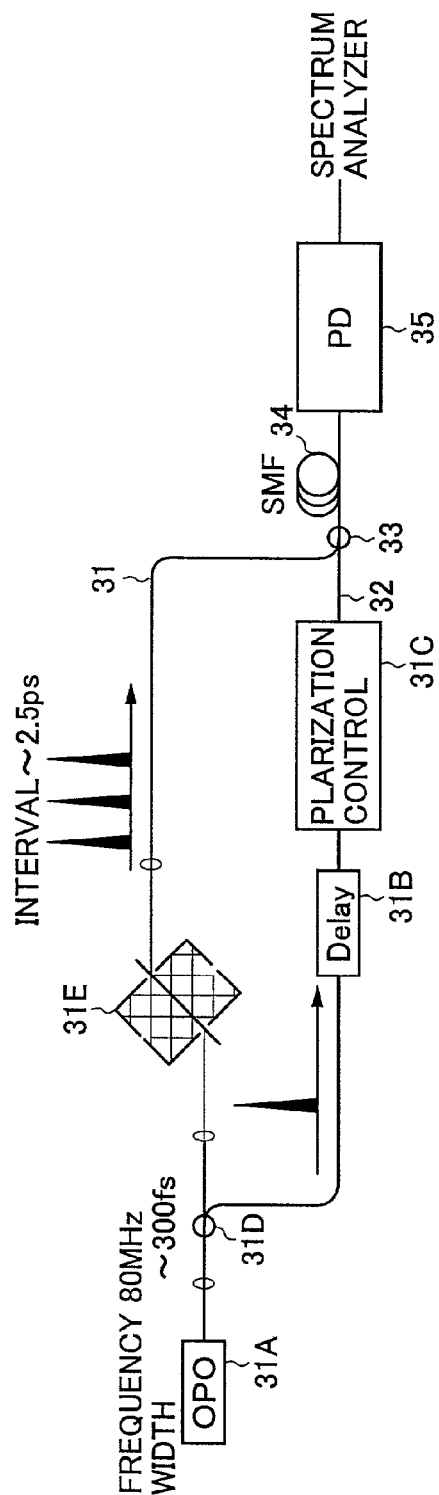
FIGS. 5A and 5B are diagrams explaining result of an experiment conducted with regard to the optical time-division multiplex signal receiver of FIG. 3.

FIG. 5A shows the construction of the optical signal processing apparatus used for verifying the possibility of the optical time-division multiplex signal processing apparatus 30 of FIG. 3, wherein those parts of FIG. 5A corresponding to the parts described previously with FIG. 3 are designated by the same reference numerals and the description thereof is omitted.

Referring to FIG. 5A, an optical pulse oscillator 31A is provided at an input end of the optical fiber 32, and the optical pulse oscillator 31A injects optical pulses having a pulse width of about 300 fs (femtoseconds) into the optical fiber 32 with a frequency of 80 MHz.

Figure 5B:
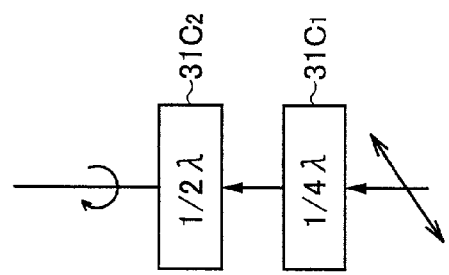

In the optical fiber 32, there is provided an optical delay element 31B and a polarization controller 31C between the optical pulse oscillator 31A and the optical coupler 33, and the optical pulses produced by the optical pulse oscillator 31A are provided with a delay time by the optical delay element 31B and a polarization plane by the polarization controller 31C. After being provided with the delay time and the polarization plane by the optical delay element 31B and the polarization controller 31C as noted above, the optical pulses are injected into the single-mode optical fiber loop 34 used as a the dispersion medium via the optical coupler 33. It should be noted that the polarization controller 31C is formed of a quarter-wavelength retardation plate $31C_1$ and a half-wavelength retardation plate $31C_2$ aligned on an optic axis as represented in FIG. 5B. Thus, the plane of polarization of an incoming optical can be controlled by rotating the polarization controller 31C about the optical axis in the case that an incident optical beam has been entered. In the construction of FIG. 5A, an ordinary single-mode optical fiber having a length of 1 km is used for the single-mode optical fiber loop 34. Such a single mode optical fiber may be the one having a zero dispersion at the wavelength 1.3 μm band and a maximum dispersion of 10 ps/km at the wavelength of 1.55 μm band.

Meanwhile, the output optical pulse of the optical pulse oscillator 31 A is branched by a coupler 31D provided between the optical delay element 31B and the optical pulse oscillator 31 A. The optical pulse thus branched is then converted to an optical pulse train having an interval of about 2.5 ps by an optical multiple reflection element 31E in which a half mirror and a prism are combined. In the construction of FIG. 5, the optical pulse train thus formed is injected to the optical fiber 31 as an optical multiplex signal substituting the optical time-division multiplex signal OTDM.

Figure 17:
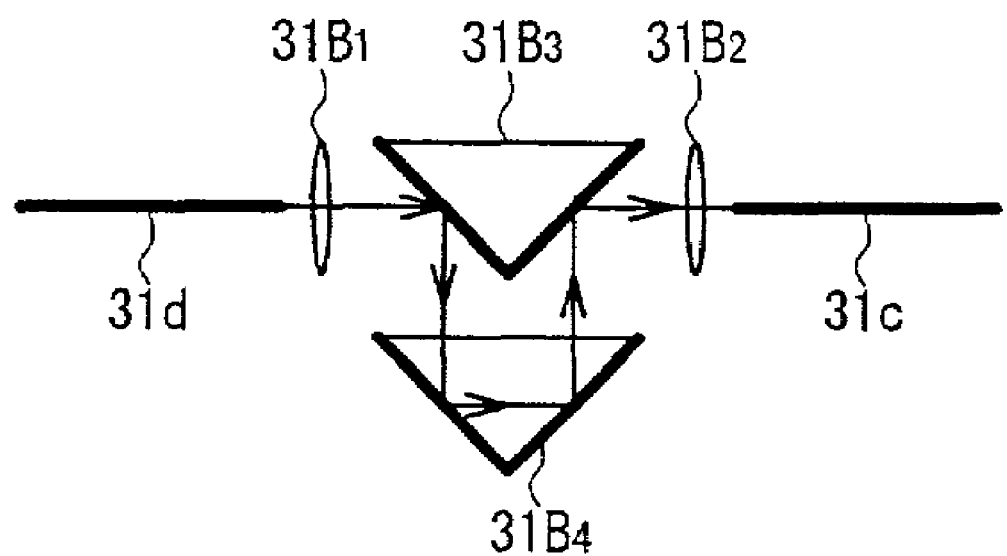
FIG. 17 is a diagram showing the construction of an optical delay element used in the present invention.

FIG. 17 shows an example of the optical delay element 31B.

Referring to FIG. 17, the optical delay element 31B includes a lens $31B_1$ coupled to the input-side optical fiber 31d extending from the optical coupler 31D and a lens $31B_2$ coupled to an optical fiber 31c that extends to the polarization controller 31C. Further, right-angle prisms $31B_3$ and $31B_4$ are disposed between the lens $31B_1$ and the lens $31B_2$ in such a manner that the distance between the prism $31B_3$ and the prism $31B_4$ is variable. Thus, the optical beam supplied along the optical fiber 31d is reflected toward the right angle prism $31B_4$ at a first mirror surface of the right angle prism $31B_3$, while the right angle prism $31B_4$ reflects in turn the optical beam that has come in from the right angle prism $31B_3$ consecutively by the two right-angle mirror surfaces, such that the optical beam returns to the right angle prism $31B_3$. The optical beam thus returned to the right angle prism $31B_3$ is reflected by another, second mirror surface perpendicular to the foregoing first mirror surface and is injected to the output-side optical fiber 31c via the lens $31B_2$. By changing the distance between prisms $31B_3$ and $31B_4$ in optical delay element 31B, it is possible to cause a desired optical delay.

Figure 6:
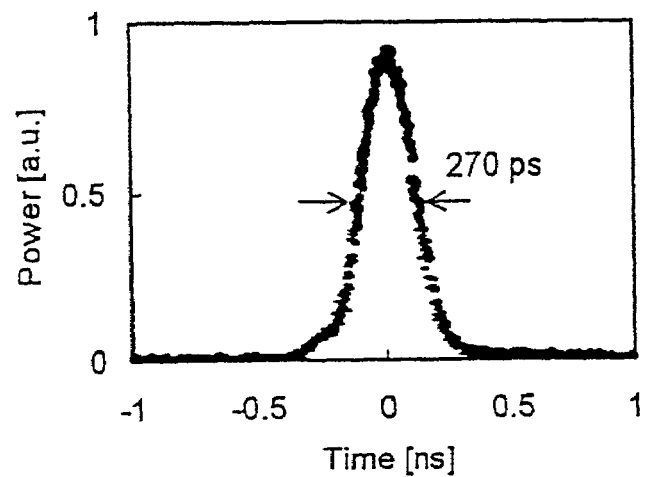
FIG. 6 is another diagram explaining the experiment regarding to the optical time-division multiplex signal receiver of FIG. 3.

FIG. 6 shows the waveform obtained for the case in which an optical pulse having an initial pulse half-height width of 300 fs, formed by the optical pulse oscillator 31 A, is caused to pass through the optical fiber 34.

Referring to FIG. 6, it can be seen that the optical pulse has a pulse half-height width of about 270 ps, indicating that there actually occurred a substantial optical dispersion in the optical fiber 34.

Figure 7:
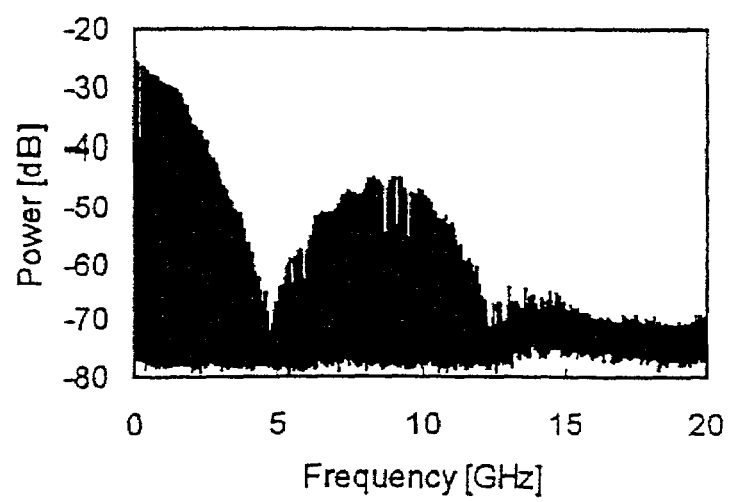
FIG. 7 is a further diagram explaining the experiment regarding the optical time-division multiplex signal receiver of FIG. 3.

FIG. 7 shows the result of analysis of the output electric signal of the photodiode 35 by using a spectrum analyzer.

Referring to FIG. 7, it can be seen that there appears a spectral peak in the output electric signal of the photodiode 35 in the vicinity of 0 GHz in each of the optical pulses transmitted over the optical fiber 34. In FIG. 7, it can be seen that there exists also a different spectral peak in the vicinity of 9 GHz. It should be noted that this additional spectral peak corresponds to the beat signal of the beat frequency $\Delta f$ that is formed between the signal optical pulses injected into the optical fiber 31 and the optical clock pulses injected into the optical fiber 32.

Thus, in the construction of FIG. 5A, there occurs an increase of the beat frequency $\Delta f$ when the delay time caused by the optic delay element 31B is increased, and the beat signal shifts to the side of higher frequency in the representation of FIG. 7. When delay time is decreased, on the other hand, the beat frequency $\Delta f$ is decreased, the beat signal shifts to the side of lower frequency. Naturally, when the delay time is set to zero, the spectral peak of the beat signal overlaps with the spectral peak of optical pulse itself in FIG. 7.

Figure 8:
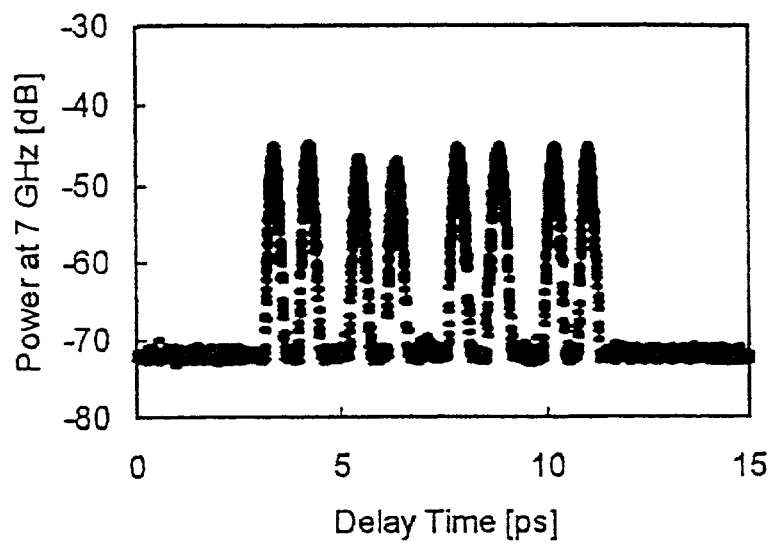
FIG. 8 is a further diagram explaining the experiment regarding the optical time-division multiplex signal receiver of FIG. 3.

Further, FIG. 8 shows the output electric signal of the photodiode 35 corresponding to the beat frequency component of 7 GHz for the case the delay time of the optic delay element 31B is changed variously in the construction of FIG. 5A.

Referring to FIG. 8, the first peak pair observed in the vicinity of the delay time of 3 ps corresponds to the beat between the first optical pulse of the OTDM signal from the optical fiber 31 and the optical clock pulse from the optical fiber 32. It can be seen that there appear two peaks in the output electric signal of the photodiode 35 respectively in correspondence to the case in which the timing of the optical clock pulse is in advance with respect to the timing of the OTDM signal pulse and in correspondence to the case in which the timing of the optical clock pulse is behind the timing of the OTDM signal pulse. The peak pair that follows the foregoing peak pair corresponds to the beat between the second OTDM signal pulse and the optical clock pulse. A similar relationship holds also for the third and fourth peak pairs.

Thus, it was demonstrated that it is possible to form a beat signal between the incoming optical time-division multiplex signal OTDM and the optical clock signal by using the construction of FIG. 3 and that the detection of such a beat signal is possible by the construction of FIG. 3.

Figure 9:
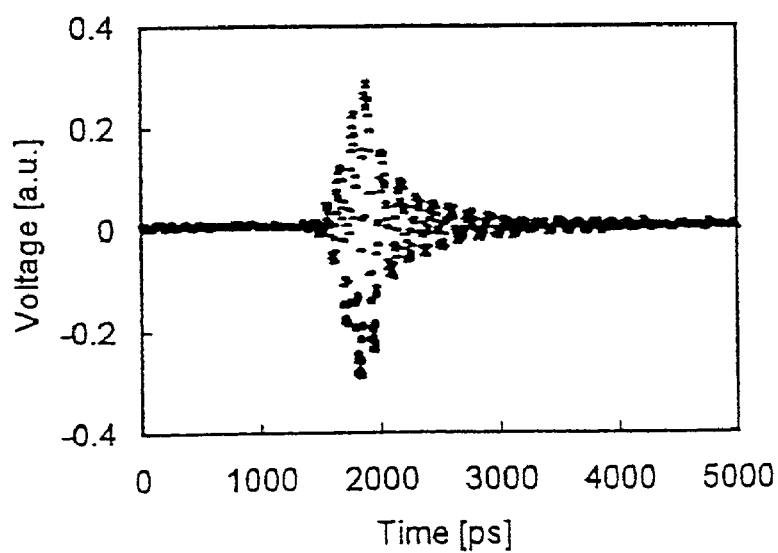
FIG. 9 is a further diagram explaining the experiment regarding the optical time-division multiplex signal receiver of FIG. 3.
Figure 10:
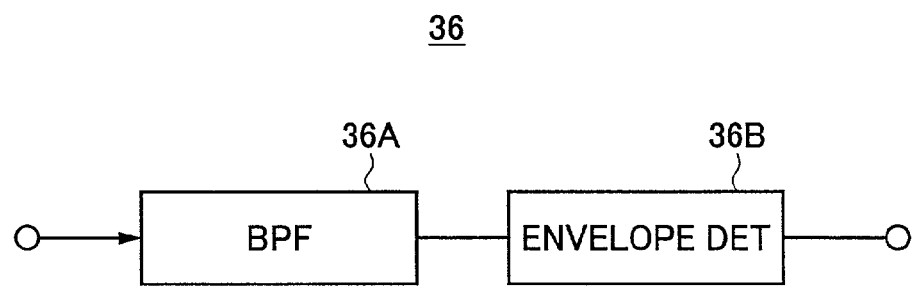
FIG. 10 is a diagram showing the construction of an output electric signal used in the optical time-division multiplex signal receiver of FIG. 3.

FIG. 9 shows the waveform of the signal component of the channel 1 obtained by filtering the output voltage signal of the photodiode 35 by the filter 36A in the demodulation circuit of FIG. 10. By detecting the output voltage signal by using an envelop detector 36B, it is possible to reproduce the information of the channel 1.

Figure 11:
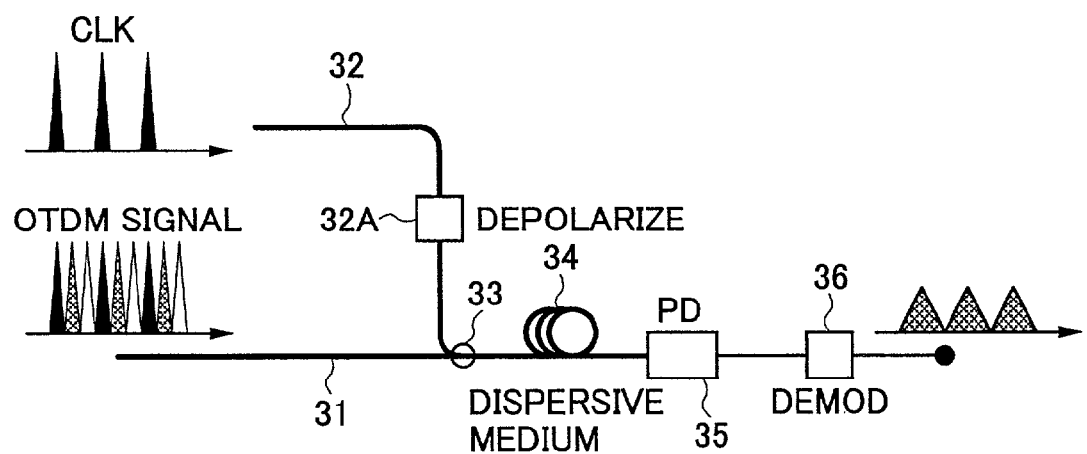
FIG. 11 is a diagram showing a modification of the optical time-division multiplex signal receiver of FIG. 3.

FIG. 11 shows a modification of the receiver 30 of FIG. 3.

In the construction of FIG. 11, a polarization eliminator device 32 A is provided for eliminating polarization from the optical clock signal CLK injected into the optical fiber 32. The polarization eliminator device 32 A may be provided to the output end of optical coupler 33.

[Second Embodiment]

Figure 12:
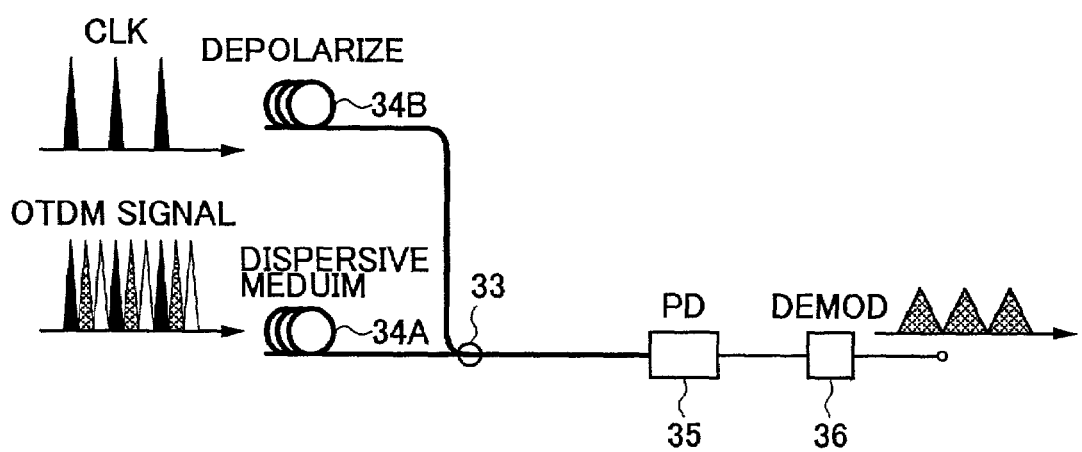
FIG. 12 is a diagram showing the construction of an optical time-division multiplex signal receiver according to a second embodiment of the present invention.

FIG. 12 shows the construction of a receiver 40 of optical time-division multiplex signals according to a second embodiment of the present invention, wherein those parts corresponding to the parts described previously are designated by the same reference numerals and the description thereof will be omitted.

Referring to FIG. 12, an optical time-division multiplex signal OTDM enters into a first dispersion medium 34A formed of a single-mode optical fiber in the reception device 40 of this embodiment, and an optical clock signal CLK enters into a second dispersion medium 34B of also a single-mode optical fiber. The optical fibers 34A and 34B are coupled optically with each other in the optical coupler 33, and the optical time-division multiplex signal OTDM and the optical clock signal CLK are superposed in the optical coupler 33 and supplied to the photodiode 35 for optical-electric conversion.

Furthermore, the output electric signal of the photodiode 35 is processed by the demodulator circuit 36 shown in FIG. 10, and the information of desired channel is reproduced in the form of electric signal.

Thus, the optical time-division multiplex signal OTDM and the optical clock signal CLK are provided with a chirp by causing a dispersion in the respective dispersion media 34A and 34B. By using a medium having substantially the same dispersion characteristic for the dispersion media 34 A and 34B, an operation similar to the receiver 30 of FIG. 3 can be realized.

[Third Embodiment]

Figure 13:
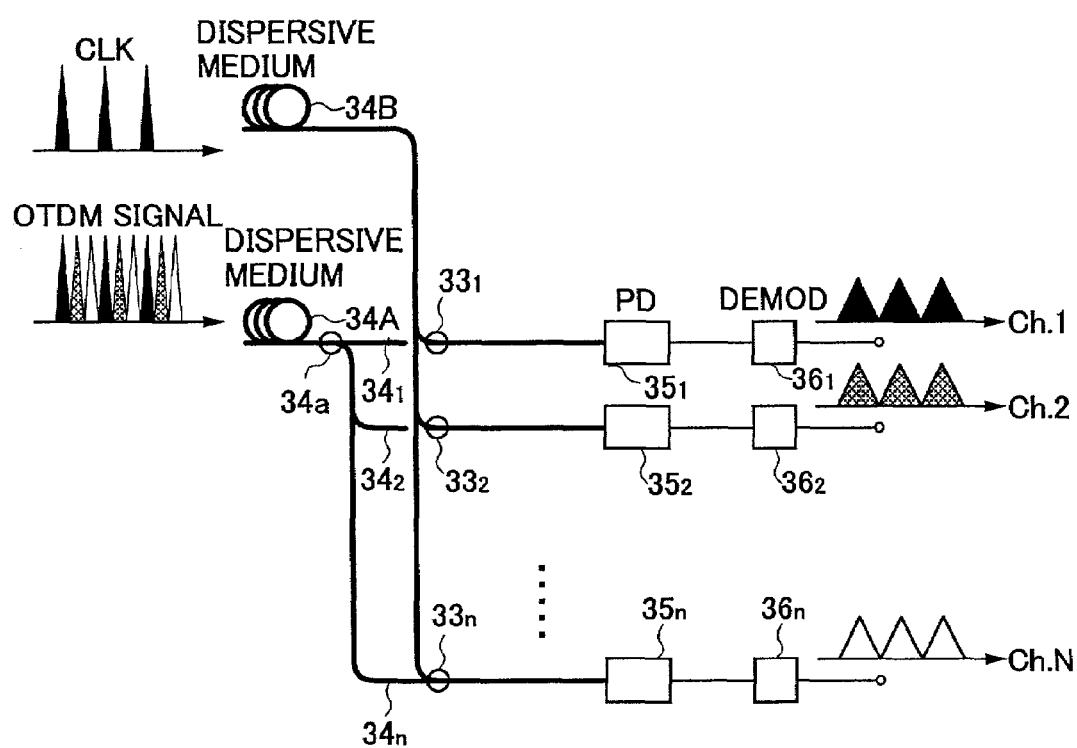
FIG. 13 is a diagram showing the construction of the a multi-channel optical time-division multiplex signal receiver according to a third embodiment of the present invention.

FIG. 13 shows the construction of a multi-channel optical time-division multiplex signal receiver 50 according to a third embodiment of the present invention, wherein those parts of FIG. 13, corresponding to the parts described previously are designated by the same reference numerals and the description thereof will be omitted.

Referring to FIG. 13, an optical coupler 34a is provided at the output side of the dispersion medium 34A, and the optical time-division multiplex signal OTDM that has passed through the dispersion medium 34A is branched to plural optical waveguides $34_1$–$34_n$, wherein each of the optical waveguides $34_1$–$34_n$ extends to a corresponding one of the optical couplers $33_1$–$33_n$.

Each of the optical couplers $33_1$–$33_n$, is coupled optically with the dispersion medium 34B, and the optical time-division multiplex signal OTDM having a chirp is superposed with the optical clock signal CLK also having a chirp in each of the optical couplers $33_1$–$33_n$.

The optical signal thus formed is then forwarded from the optical couplers $33_1$–$33n$ to the corresponding photodiodes $35_1$–$35_n$ for conversion to electric signals.

The output electric signals of the photodiodes $35_1$–$35_n$ are then processed by the output electric signals $36_1$–$36_n$. Thus, the beat signal components corresponding to the desired channels $Ch_1$–$Ch_n$ are extracted by filtering out the output electric signals $36_1$–$36_n$ individually, and the output electric signals thus filtered out are then subjected to an envelop detection process.

Figure 14:
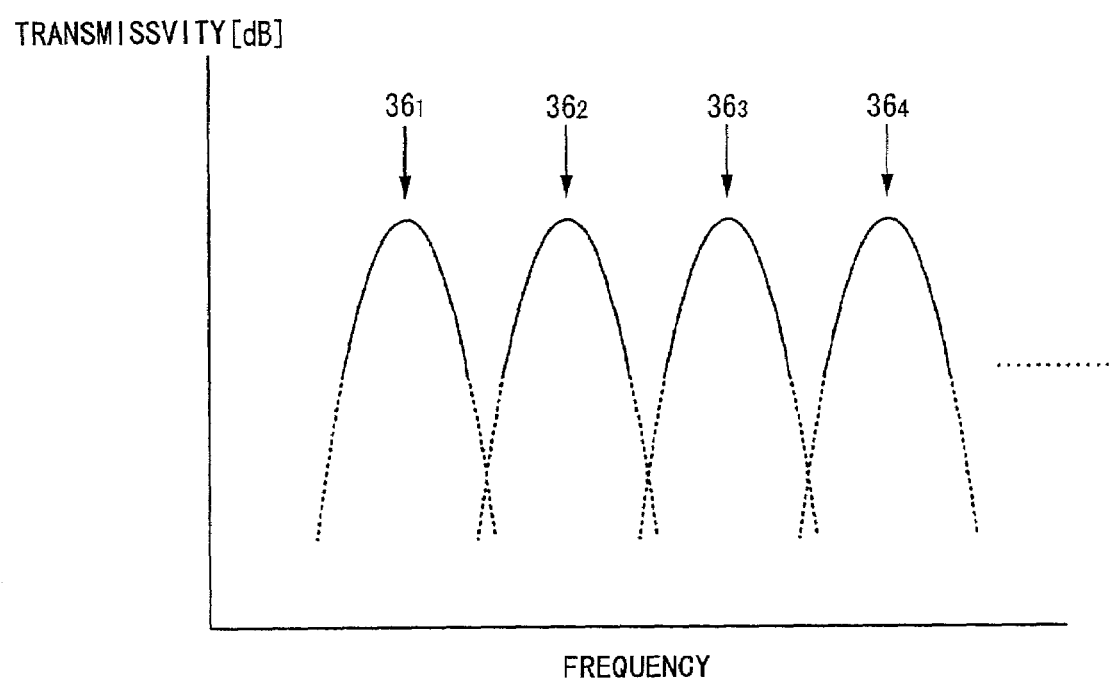
FIG. 14 is a diagram showing the band-pass characteristics used in a demodulator circuit in the receiver of FIG. 13.

FIG. 14 shows the characteristic of a filter that is used with output electric signals $36_1$–$36_n$ for separating the signals of respective channels in the construction of FIG. 13.

As can be understood from FIG. 14, filters having different pass-bands are provided in the demodulation circuits $36_1$–$36_n$. Thus, it becomes possible to extract a beat signal between the optical signal component and the optical clock signal CLK for any arbitrary optional channels $Ch_1$–$Ch_n$ as explained previously with reference to (e) of FIG. 4.

[Fourth Embodiment]

Figure 15:
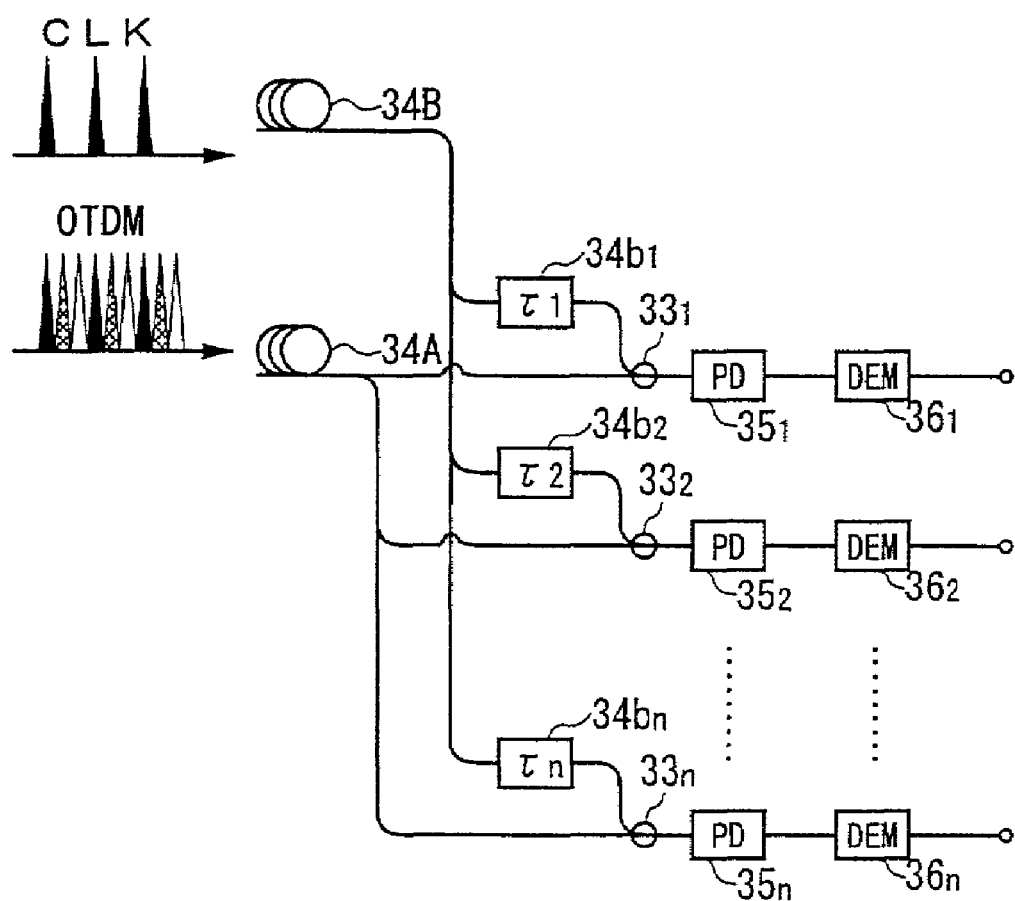
FIG. 15 is a diagram showing the construction of a multi-channel optical time-division multiplex signal receiver according to a fourth embodiment of the present invention.
Figure 16:
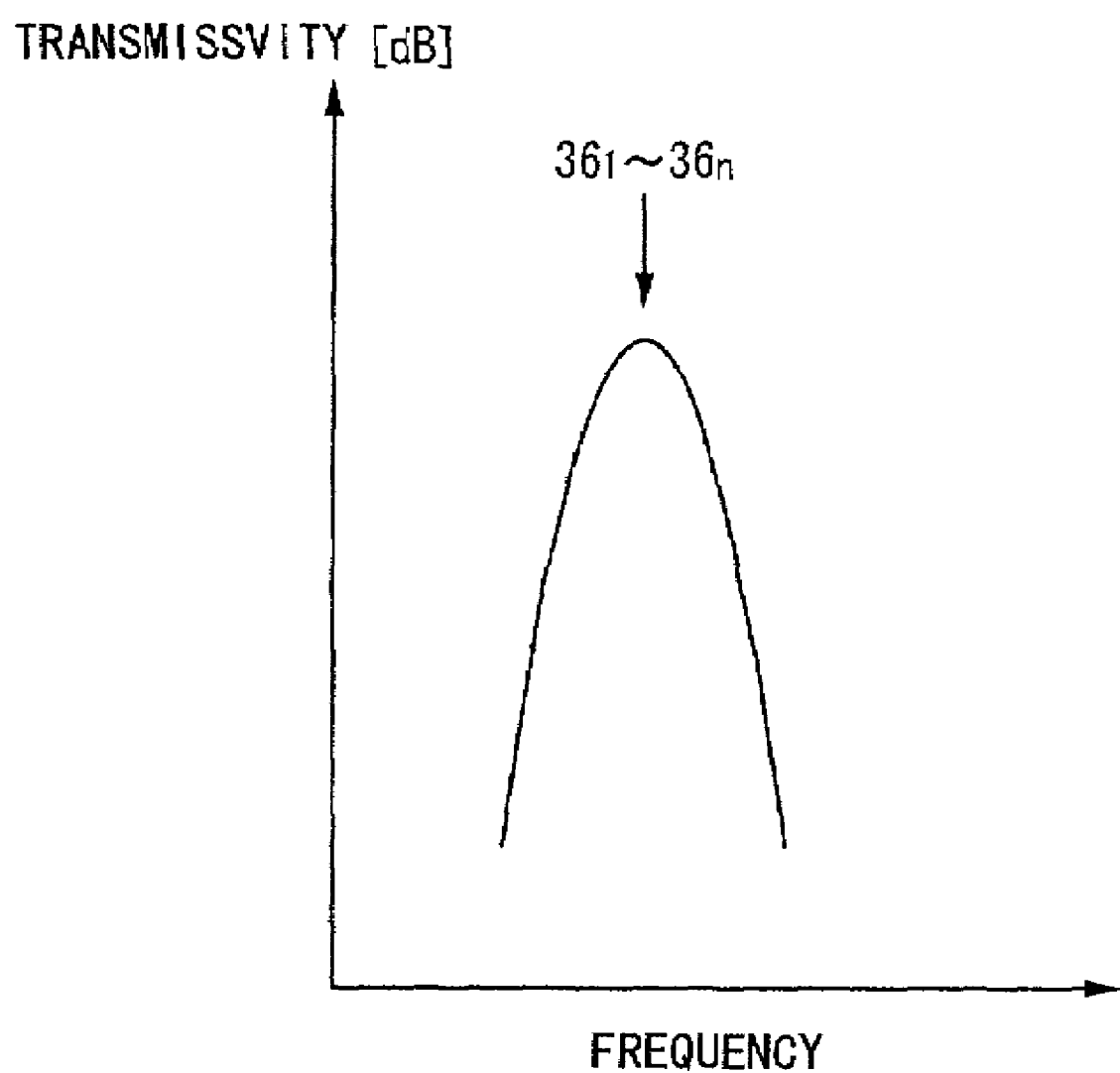
FIG. 16 is a diagram showing the band-pass characteristics are used in a demodulator circuit in the receiver of FIG. 15.

FIG. 15 shows the construction of a multi-channel optical time-division multiplex signal receiver 60 according to a fourth embodiment of the present invention, wherein those parts of FIG. 15 explained previously are designated by the same reference numerals and the description thereof will be omitted.

Referring to FIG. 15, optical delay elements $34b_1$, $34b_2$, ... $34b_n$ are provided between the dispersion medium 34B and optical coupler $33_1$, between the dispersion medium 34B and optical coupler $33_2$, . . . , between the dispersion medium 34B and the optical coupler $33_n$ in the reception device 60, respectively, wherein the optical delay element $34b_1$ has a delay time $\tau_1$ determined so as to form a beat signal of 7 GHz band, for example, between the optical signal component for the channel $Ch_1$ in the optical time-division multiplex signal OTDM and optical clock signal CLK. Similarly, the optical delay element $34b_2$ has a delay time $\tau_2$ determined so as to provide a beat signal of 7 GHz band between the optical signal component of the channel $CH_2$ in optical time-division multiplex signal OTDM and the optical clock signal CLK. Further, the optical delay element $34b_n$ has a delay time $\tau_n$ determined such that a beat signal of 7 GHz band is formed between the optical signal component of the channel $CH_n$ in the optical time-division multiplex signal OTDM and the optical clock signal CLK.

In the receiver 60 of such construction, it becomes possible to reproduce the optical signal of each channel in the optical time-division multiplex signal OTDM by filtering the output electric signal of the photodiodes $35_1$–$35_n$ in the cooperating demodulation circuits $36_1$–$36_n$ with substantially the same pass-band frequency corresponding to the beat frequency.

In the construction of FIG. 15, it should be noted that the demodulation circuits $36_1$–$36_n$ process the signals of the same frequency band such as 7 GHz. Thus, the demand for response speed imposed to the photodiodes $35_1$–$35_n$ is relaxed substantially as compared with the construction of FIG. 13.

In each of the aforementioned embodiments, it should be noted that the dispersion media 34, 34A and 34B are not limited to a single mode optical fiber loop but a prism or diffraction grating can be used for this purpose.

Further, the present invention is not limited to those embodiments described heretofore, but various variations and modifications may be made without departing from the scope of the invention.

What is claimed is:

1. An optical time-division multiplex signal processing apparatus, comprising:

an optical dispersion part supplied with an optical time-division multiplex signal and an optical clock signal via respective, different paths, said optical dispersion part providing optical dispersion to said optical time-division multiplex signal and said optical clock signal;

an optical detector coupled optically to said optical dispersion part, said optical detector detecting a beat of said optical time-division multiplex signal and said clock signal from said optical dispersion part in a superposed state; and a filter connected to an output terminal of said optical detector, said filter extracting an electric signal of a desired beat frequency band from an output electric signal of said optical detector.

2. An optical time-division multiplex signal processing apparatus as claimed in claim 1, wherein said optical dispersion part comprises an optical coupler having a first input end to which said optical time-division multiplexed optical signal is supplied and a second input end to which an optical clock signal is supplied, said optical coupler optically coupling said optical time-division multiplex signal with said optical clock signal therein, and a dispersion medium coupled optically to an output end of said optical coupler, said dispersion medium causing an optical dispersion in said optical time-division multiplex signal and said optical clock signal.

3. An optical time-division multiplex signal processing apparatus as claimed in claim 2, wherein said dispersion medium is selected from any of a single-mode optical fiber, a diffraction grating and a prism.

4. An optical time-division multiplex signal processing apparatus as claimed in claim 2, wherein said optical coupler includes a depolarization element at said second input end.

5. An optical time-division multiplex signal processing apparatus, comprising:

an optical dispersion part supplied with an optical time-division multiplex signal and an optical clock signal, said optical dispersion part providing optical dispersion to said optical time-division multiplex signal and said optical clock signal;

an optical detector coupled optically to said optical dispersion part, said optical detector detecting said optical time-division multiplex signal and said clock signal from said optical dispersion part in a superposed state; and a filter connected to an output terminal of said optical detector, said filter filtering out an electric signal of a desired frequency band from an output electric signal of said optical detector;

wherein said optical dispersion part comprises an optical coupler having a first input end to which said optical time-division multiplexed optical signal is supplied and a second input end to which an optical clock signal is supplied, said optical coupler optically coupling said optical time-division multiplex signal with said optical clock signal therein, and a dispersion medium coupled optically to an output end of said optical coupler, said dispersion medium causing an optical dispersion in said optical time-division multiplex signal and said optical clock signal, wherein said optical dispersion part comprises a first dispersion medium supplied with said optical time-division multiplex signal, a second dispersion medium supplied with said optical clock signal, and an optical coupler coupling said optical time-division multiplex signal passed through said first dispersion medium and said optical clock signal passed through said second dispersion medium.

6. A processing method of an optical time-division multiplex signal, comprising the steps of:

providing a chirp to each of an optical time-division multiplex signal and an optical clock signal supplied via respective paths;

detecting said optical time-division multiplex signal and said optical clock signal in a superimposed state; and extracting a beat component formed between said optical time-division multiplex signal and said optical signal provided with respective chirp.

7. An optical time-division multiplex signal receiver, comprising:

an optical dispersion part supplied with an optical time-division multiplex signal and an optical clock signal, said optical dispersion part providing a chirp to each of said optical time-division multiplex signal and said optical clock signal;

an optical detector coupled optically to said optical dispersion part, said optical detector receiving said optical time-division multiplex signal and said optical clock signal in a superposed state and detecting a beat formed between said optical time-division multiplex signal and said optical clock signal;

a filter connected to an output terminal of said optical detector, said filter extracting an electric signal of a desired beat frequency band from an output electric signal of said optical detector; and an envelop detector supplied with an output signal of said filter.

8. An optical time-division multiplex receiver, comprising:

a first optical dispersion part supplied with an optical time-division multiplex signal and causing an optical dispersion therein;

a second optical dispersion part supplied with an optical clock signal and causing an optical dispersion therein;

a plurality of optical detectors each coupled optically to said first and second optical dispersion parts, each of said optical detectors receiving said optical time-division multiplex signal and said optical clock signal in a superposed state, each of said optical detectors producing a beat formed between said optical time-division multiplex signal and said optical clock signal;

a plurality of band-pass filters each provided in correspondence to one of said plurality of optical detectors, each of said band-pass filters extracting an output signal of said optical detector of a beat frequency corresponding thereto; and a plurality of envelop detectors each provided in correspondence to one of said plurality of band-pass filters, wherein said plurality of band-pass filters have mutually different band-pass characteristics.

9. An optical-time division multiplex signal receiver as claimed in claim 8, wherein each of said plurality of band-pass filters has a pass-band tuned to a frequency of a beat component formed between an optical signal component included in said time-division multiplex optical signal and said optical clock signal.

10. An optical time-division multiplex receiver, comprising:
 a first optical dispersion part supplied with an optical time-division multiplex signal and providing an optical dispersion thereto;
 a second optical dispersion part supplied with an optical clock signal and providing an optical dispersion thereto;
 a plurality of optical delay elements each coupled to said second optical dispersion part, each of said plurality of optical delay elements inducing a delay in an optical clock signal supplied thereto from said second optical dispersion part;
 a plurality of optical detectors each coupled optically to said first optical dispersion part and further to one of said plurality of optical delay elements, each of said optical detectors detecting said optical time-division multiplex signal from said first dispersion part and said optical clock signal from said optical delay element;
 a plurality of band-pass filters each supplied with an output signal of one of said plurality of optical detectors corresponding thereto; and
 a plurality of envelop detectors each supplied with an output signal of one of said plurality of band-pass filters corresponding thereto.

11. An optical time-division multiplex signal receiver as claimed in claim 10, wherein said band-pass filters have a substantially identical pass-band.

12. An optical time-division multiplex signal receiver as claimed in claim 11, wherein said plurality of optical delay elements are provided in correspondence to a plurality of channels in said optical time-division multiplex signal, and wherein each of said optical delay elements has a delay time set so as to form a beat signal between an optical signal of a corresponding channel and said clock signal with a frequency corresponding to said pass-band.

* * * * *